Jan. 11, 1966     S. L. RANKIN ETAL     3,228,563
DEVICE WITH POSITIVE DISPLACEMENT VALVE UNIT
Filed April 3, 1962     3 Sheets-Sheet 1
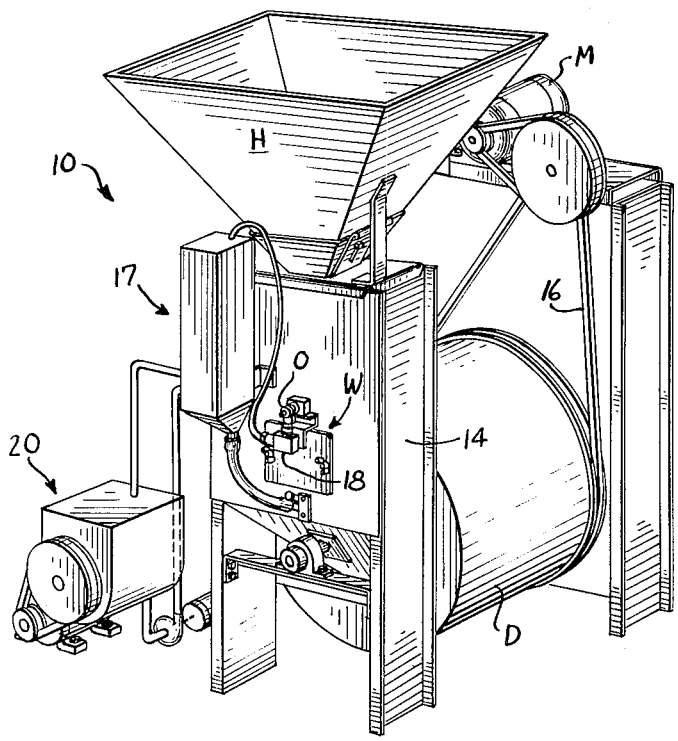
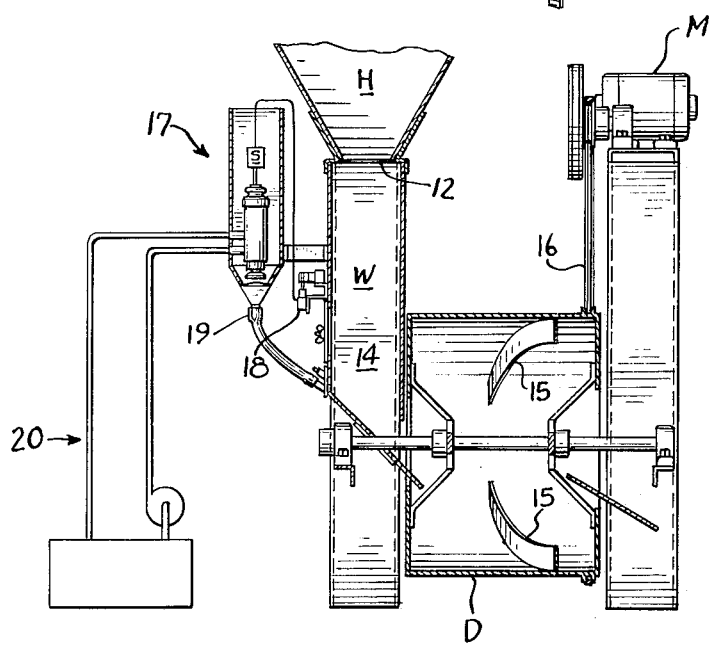
INVENTORS
STANLEY L. RANKIN
BY MYRON E. LUSK
Wolfe, Hubbard, Voit & Osann
ATTYS.

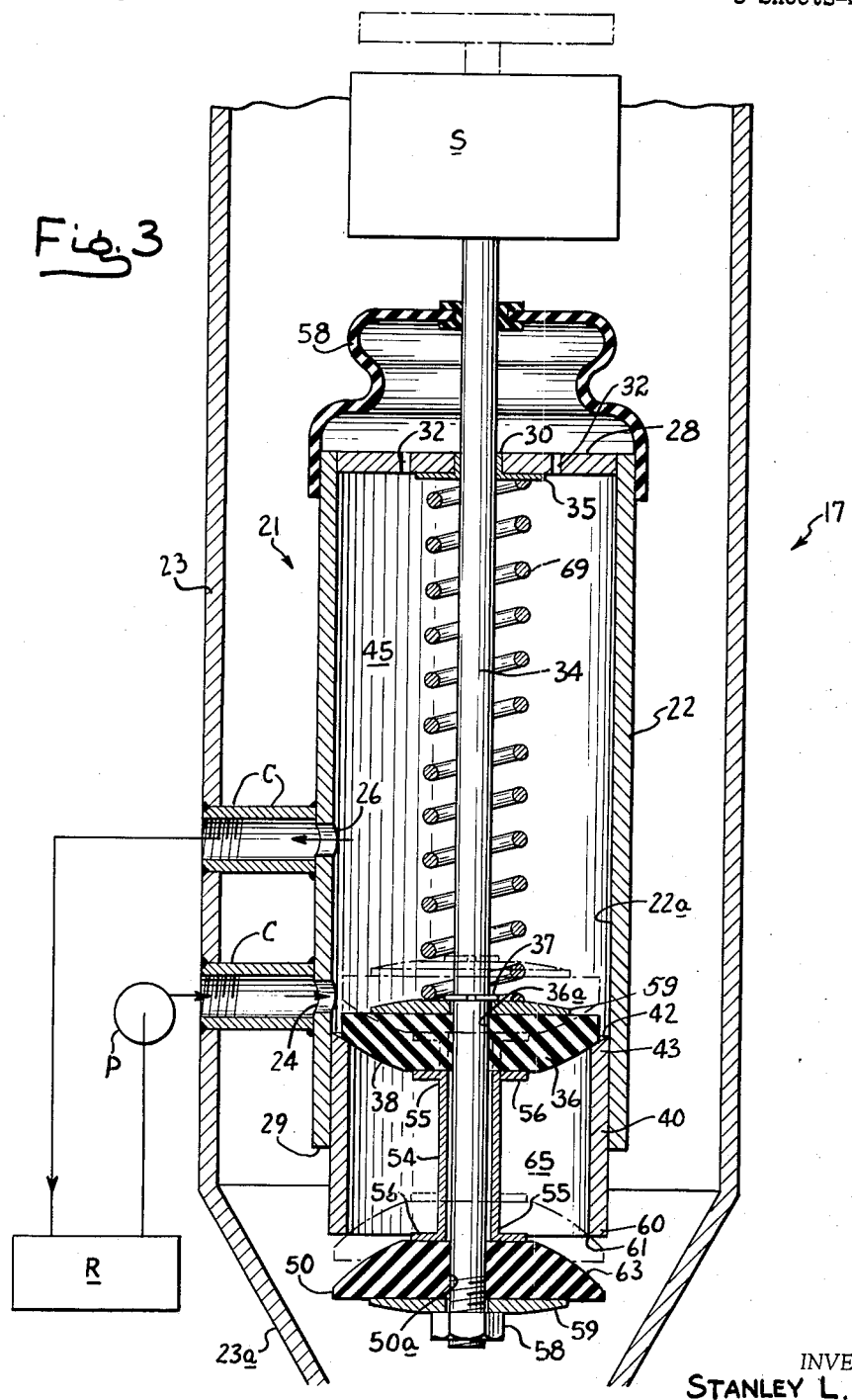

Jan. 11, 1966  S. L. RANKIN ETAL  3,228,563
DEVICE WITH POSITIVE DISPLACEMENT VALVE UNIT
Filed April 3, 1962  3 Sheets-Sheet 3

INVENTORS
STANLEY L. RANKIN
MYRON E. LUSK
by: Wolfe, Hubbard, Voit & Osann
ATTYS.

United States Patent Office 3,228,563
Patented Jan. 11, 1966

3,228,563
DEVICE WITH POSITIVE DISPLACEMENT
VALVE UNIT
Stanley L. Rankin, 810 N. 10th St., Keokuk, Iowa, and
Myron E. Lusk, 1435 Ohio St., Quincy, Ill.
Filed Apr. 3, 1962, Ser. No. 184,840
8 Claims. (Cl. 222—77)

This invention relates generally to metering valves and, more particularly, to apparatus for repeatedly metering small but accurate quantities of a heterogeneous, stratifiable fluid system, e.g., a slurry, suspension, emulsion, mixture, or the like, whereby the metered quantities comprise the same, or essentially the same composition as the main body of such fluid.

In numerous situations, it is both necessary and desirable to be able to remove a representative portion of a flowable substance with repeatable accuracy so as to provide a test sample thereof for example, or, in other instances, to provide a determinable amount of the fluid for some particular purpose, such as adding the same to another product. Thus, it is necessary to be able to divide or meter out a given quantity of the fluid which will have the same representative composition as that of the parent fluid, and to be able to do this time after time and obtain the same quantity of the fluid. Problems of this type become accentuated when the fluid to be metered in this manner is a slurry, i.e., a percentage of insoluble solid matter dispersed in a relatively homogeneous carrier. When such a mixture is to be metered, difficulty is experienced in obtaining a representative sample of the mixture, and, accordingly, it is an object of the present invention to provide an apparatus for overcoming these metering problems.

The present invention has as one of its objects the provision of apparatus capable of repeatedly removing a metered sample from a representative sample of a heterogeneous stratifiable fluid including one which is a mixture of a finely dispersed solid being carried by an appropriate carrier fluid, with repeatable accuracy. It is both necessary and desirable that the metered quantity be, in all ways, representative of the parent body of slurry, and, accordingly, it is a related object to provide an improved metering valve which is capable of extracting a metered quantity of fluid, including a slurry, from a circulating mass thereof, which will contain the same proportion of solid to liquid as the parent mixture.

It is a further object of the present invention to provide a metering valve which will meter slurry or the like, including those having a high solid content, with minimum resultant aeration of the liquid or settling out of the solid material carried thereby.

It is an additional object of the present invention to provide a metering device which is capable of mass manufacture in a variety of metering capacities without effecting substantial alterations in the construction of the apparatus.

These and other objects and advantages will become more apparent in the reading of the following detailed description in conjunction with the appended drawing, wherein:

FIGURE 1 is a perspective view of a seed-treating device which embodies the present invention, illustrating a practical use thereof;

FIG. 2 is a partial sectional plan view of FIG. 1, providing a more detailed view of the operational relation of the various elements of the apparatus;

FIG. 3 is one typical system including a metering valve embodying the present invention, which device is shown in vertical section.

Figure 4:
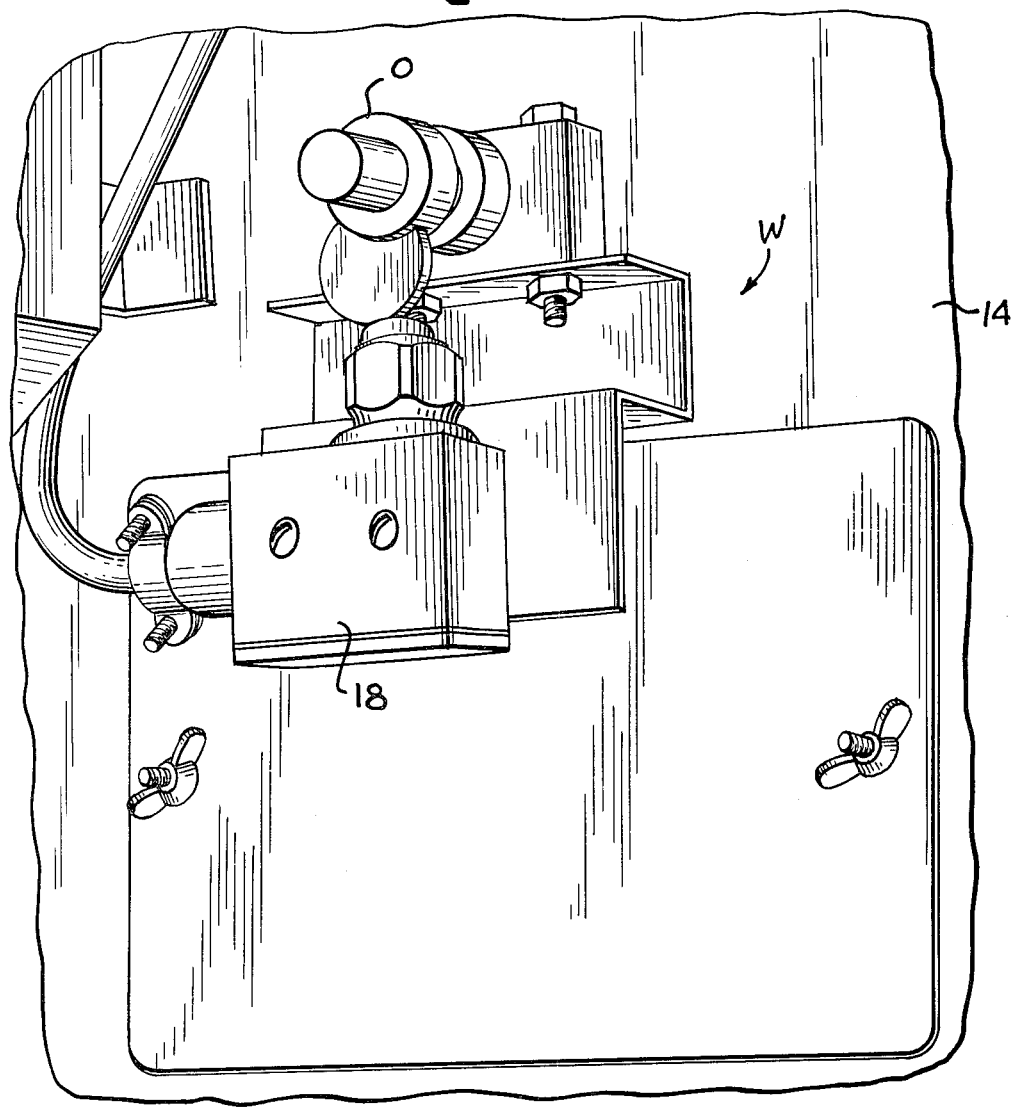
FIG. 4 is an enlarged perspective view of the cam and switch arrangement included in the seed-treating device of FIG. 1.

The present invention has particular utility in the field of seed inoculation. For this reason, and as a matter of convenience, it will be described and illustrated with reference to its use in that field. It will be understood, however, that a variety of uses as well as alternative constructions are contemplated without departure from the spirit and scope of the invention, which is to be construed in the light of the appended claims.

The inoculation of leguminous plants with strains of nitrogen fixing bacteria is a proven method of increasing the yield of such crops. The nature of the operation requires an accurate means of supplying the correct amount of inoculant to the seed. A convenient method of preparing inoculants is to form them into a relatively thick slurry which may be composed, for example, of a number of strains of nitrogen fixing bacteria mixed with a moistened carrier such as humus or peat. Other materials may also be present, e.g., an added nutrient such as sucrose may be present to encourage bacteria growth. It is important that the respective components of an inoculant slurry be thoroughly intermixed to provide an essentially homogeneous mixture, otherwise each seed inoculated would not get the same proportion of needed elements, which is predetermined for optimum growth. The homogeneity of such a slurry is achieved and maintained by suitable agitation and/or circulation thereof.

Seeds are conventionally inoculated in batches. Thus, a measured amount of the inoculant mixture is metered from the parent mixture and the metered quantity may then be made to cover each seed of a batch which may, if desired, be slightly prewetted so as to better receive the inoculant.

A seed-treating machine is illustrated at 10 in FIG. 1, which embodies the present invention in one of its exemplary forms. Machines of this type are employed for inoculating seed which is placed in the hopper H at the top of the machine. The hopper H discharges seed through a narrow port 12, at the bottom thereof, onto a weighing device W which weighs and separates the seed into batches of predetermined size. From the weighing device, the seed batch is fed gravitationally through a passage 14 to a rotating drum D supported on the frame of the machine. The interior of the drum is equipped with appropriate baffles 15 for agitating the contents thereof when the drum is rotated by means of the electric motor M, which is provided for driving the drum by means of the belt 16. Seed inoculation apparatus 17 is provided, being energized by means of an electrical switching device 18 attached to the weighing apparatus. Inoculant in predetermined amounts is discharged through a tube 19 into the stream of seed passing along passage 14, in response to a signal from the weighing apparatus W. The illustrated seed-treating machine is of a relatively well-known type and serves only to exemplify one use of the inoculation apparatus 17. The metering apparatus, however, is of novel construction, which is fully illustrated in FIG. 3, wherein the numeral 20 is used to indicate the system as a whole.

The metering system 20 is shown in detail in FIG. 3 and includes a metering valve 21 connected to the container R by appropriate conduit C. The metering valve 21, as illustrated in FIG. 3, has a housing or casing 22 which is substantially cylindrical in form and has an inner wall 22a. A protective container 23 may be provided about the valve, having a hopperlike lower portion 23a for receiving metered quantities of slurry, as will later appear. The valve may be suspended in the container by any appropriate means. Porting is provided in the side wall of the casing, an inlet port 24 being disposed below an associated outlet port 26, both of which are appropriately connected to conduits C leading to and from the mixing container R.

A pump P is shown disposed between container R and inlet port 24 for the purposes of illustrating that the slurry enters metering valve 21 under a pressure greater than atmosphere. Both the amount of pressure and the method of applying it are optional and would be expected to vary with the task to be performed.

The cylindrical casing 22 is enclosed at one end by an end wall 28 which may either be removable or permanent in the position shown. A central aperture 30 is provided in the end wall 28 and one or more venting apertures 32 are likewise provided to assure fluid access and equal pressure on either side of the end wall. An elongated valve stem or rod 34, adapted to be received in a bearing 35 fitted in the central aperture 30, extends through the casing 22 of the metering device.

A circular valve plug 36 is transversely mounted by means of a central aperture 36a provided therein on the stem 34 within the casing. A clip ring 37, retained in a matching groove (not shown) in the stem, is provided to limit the upward movement of the valve. The valve has a diameter somewhat less than the inside diameter 22a of the casing and is formed with a deflecting surface 38 which is preferably rounded in profile and which faces generally toward the open end 29 of the casing. In order to provide a seat or land against which surface 38 of plug 36 may abut, a cylindrical sleeve 40 is fitted tightly within casing 22. The inner edge 42 of the upper end 43 of sleeve 40 forms an edge against which the surface 38 may abut, providing a line contact seal. Thus, the upper end 43 of the sleeve 40 is adapted to be inserted in the open end 29 of the casing 22 and advanced therewithin until the upper end 43 is located a sufficient distance below the level of port 24 so that when plug 36 is seated firmly against edge 42, the fluid entering port 24 can readily flow above the same and have access to port 26. The sleeve may be brazed or otherwise secured in this position, depending upon whether it is to be permanently or replaceably mounted, as will later appear. When the valve plug 36 is in its lowermost position, therefore, seated against edge 42 (as indicated by the solid lines) the valve defines, with the casing 22 and the end wall 28, a reservoir chamber 45 which contains the fluid to be metered by the device, in this case slurry. The slurry may be continuously circulated through the inlet and outlet ports 24 and 26, respectively, in order to maintain its consistency.

A second valve plug 50 is provided, which is also mounted on the stem 34 which passes through an aperture 50a in the valve provided for the purpose. A spacer 54 is provided on the stem between valve plugs 36 and 50 for maintaining a fixed distance between them. The spacer is formed preferably with flanged ends 55. Flanges 56 bear, respectively, against the bottom portion of valve 36 and top portion of valve 50. The end of the stem is threaded for receiving a nut 58. A spacing washer 59 bears against the top of the valve 36 and the bottom of the valve 50 where it is secured by the nut, thus rigidly positioning the valve on the rod in a defined spatial relationship.

The distance between the valves defined by the spacer is preferably somewhat larger than the length of sleeve 40. The free end 60 of sleeve 40, which is outward from the casing, provides a sealing edge 61 for the valve 50. In order to provide an accurate line contact seal, the valve 50 is formed with a rounded surface 63 facing the edge 61. The valves 36 and 50, together with sleeve 40, define a metering chamber 65 having a determinable capacity, and one which may be varied as desired by lengthening or shortening sleeve 40, and appropriately modifying spacer 54 to assure proper valve space relation. Thus, devices of the type described may be initially constructed to provide a single predetermined metering capacity by permanently securing the sleeve in its position in the casing, or alternatively, for providing a variety of metering capacities with a single casing having internal threads, for example, and a variety of matching sleeves for field modification of the valve to suit conditions.

The valve may be constructed for manual operation if desirable in a specific environment, or may be keyed to the operation of a machine substantially in the manner indicated by the drawings, wherein the device is arranged for automatic operation in conjunction with the operation of the seed-treating machine 10. In the illustrated embodiment, the seed-weighing device W is provided with a cam arrangement O which is rotated during the weighing process. The cam follower O operates a switch which is connected to a solenoid S attached to the valve stem 34. Thus, the valve is so arranged that when the desired quantity of seed has been weighed, the metering valve 21 is actuated by the solenoid to provide an appropriate amount of inoculant in the drum to be mixed with the seed. The actual metering process involves the deflection of a portion of the slurry from the flowing stream thereof into the metering chamber 65, and to this end the valve stem is reciprocable between a fill position (dotted lines) and a metering position (solid lines). (The limits of reciprocable movement are, of course, defined by the valve seats 42 and 61.) In this case, the solenoid is the motive force.

A compression spring may be employed, as at 69, to provide a constant force in one direction, normally acting against the solenoid, so as to automatically return the valve stem 34 to a deactuated or metering position upon de-energizing the solenoid. For the purposes of accommodating the spring 69, a spring retainer is secured to the stem 34 between the clip ring 37 and the valve plug 36. The spring 69 is mounted about the valve stem between the spring retainer and the end wall 28. It will be appreciated that the particular method of reciprocating the valve stem may be varied without departing from the invention.

In the present instance, the valve 21 is normally at rest in its meter position, which is insured by the force of the compression spring 69. The solenoid is employed to move the valve stem, and, accordingly, the valve plugs 36, 50 to the fill position. In this position, valve 50 is seated on its associated land edge 61, closing the discharge end of the metering chamber 65. It will be remembered that the normal space between the valve 50 and seat 61 is such that when so moved the valve 36 is positioned opposite the inlet port 24 where it causes partial interference with the incoming flow of slurry. In this manner, the incoming flow is divided, and a portion thereof is directed downward into the metering chamber 65. By virtue of the rounded surface 38 of the valve plug 36, this portion of the slurry is deflected downward so as to cause turbulence of the slurry in the metering chamber 65. The remainder of the flow so divided passes upward about the valve 36 in the space between the edge thereof and the inner wall 22a of the casing, into the reservoir 45. In this manner, the slurry may be continuously circulated while a portion thereof is being metered out, thus retaining, insofar as possible, a consistent mixture. Accordingly, that portion of the flow which is deflected into the metering chamber is a true representative sample of the slurry. The agitation of the slurry in the metering chamber, by virtue of the turbulent deflection of a portion of the slurry flow, tends to prevent the settling out of the heavier components of the slurry prior to the discharge thereof from the metering chamber. The turbulent effect, however, is not sufficient to cause undue aeration of the fluid. The slurry entering the inlet port will be continuously divided and deflected as long as the valve plug 36 is in its fill position under the influence of the solenoid. The solenoid will remain actuated a sufficient length of time to assure the complete filling of the metering chamber and, of course, any overflow will pass upward into the reservoir, as previously described.

When the metered slurry is to be dumped or discharged, for example, into the bottom 23a of the container 23, indicated in FIG. 1, the solenoid force holding the stem upward is released and the spring 69 returns the valve 36 to its seat 42. A determinable amount of slurry between the valve and its land will be forced downward by the curved sides 38 of the valve plug 36 and into the chamber 65, causing a slight pressure surge which has the beneficial action of flushing the contents of the chamber into hopper section 23a and into the revolving drum, as valve 50 opens, thus insuring a full measure of slurry each time. The remainder of the slurry about the valve 36 as it closes is forced upward into the remaining mass in chamber 45. The procedure outlined is repeated each time that a metered quantity of the mass is desired. In a typical seed inoculation cycle, the metering chamber might fill in approximately 1.5 seconds, and might be completely cycled every five seconds, depending upon the time to position each seed batch.

It will be understood that the present invention has utility in many instances where a metered representative quantity of a flowable substance is desired. The inoculation of seed of legume plants is but one example of the use of the device. Such alternative uses, insofar as they are contemplated by the claims, are within the intended scope and spirit of the invention.

What is claimed is:

1. In a device for metering predetermined amounts of a flowable homogeneous mixture of an insoluble particulate solid in a fluid carrier, the combination of a casing having one end thereof closed and the other open, a reservoir in said casing, inlet and outlet ports in said casing for the passage of the flowable substance to and from said reservoir, said ports being disposed in vertical spaced relation with the former below the latter, valve means in said casing including an elongated stem journaled for reciprocal movement in the closed end of said casing, first and second valve plugs rigidly secured to said stem in predetermined spaced relation, with said first plug disposed in said reservoir below said inlet port, said second plug defining, in cooperation with said casing and said first plug a metering chamber of a predetermined volume communicable with said reservoir at the instance of said first plug, a sleeve extending at least part way into the open end of said casing, and having a length less than the distance between said valve plugs, the extremities of said sleeve having edges defining seats for said valve plugs, said stem being reciprocable to alternately seat said valve plugs on their respective seats, such that when said second valve plug is seated, said first valve plug is disposed opposite said inlet port for deflecting at least a portion of the flowable substance downward into said metering chamber, thereby filling the same with the substance, and when said first valve plug is seated, said second valve plug is spaced from its respective seat so as to define therewith an opening for the discharge of the metered contents of said metering chamber.

2. In a device for metering predetermined amounts of a flowable homogeneous mixture of an insoluble particulate solid in a fluid carrier, the combination of a casing having one end thereof closed and the other open, a reservoir in said casing, inlet and outlet ports in said casing for the passage of the flowable substance to and from said reservoir, said ports being disposed in vertical spaced relation with the former below the latter, valve means in said casing including an elongated stem journaled for reciprocal movement in the closed end of said casing, first and second valve plugs rigidly secured to said stem in predetermined spaced relation with said first plug disposed at the end of said reservoir below said inlet port, said second plug defining, in cooperation with said casing and said first plug a metering chamber of a predetermined volume communicable with said reservoir at the instance of said first plug, a sleeve extending at least part way into the open end of said casing, and having a length less than the distance between said valve plugs, the extremities of said sleeve having edges defining seats for said valve plugs, said stem being reciprocable to alternately seat said valve plugs on their respective seats, such that when said second valve plug is seated, said first valve plug is disposed opposite said inlet port, a rounded surface on said first valve plug for deflecting at least a portion of the flowable substance downward into said metering chamber, thereby filling the same with the substance and at the same time causing the turbulent circulation thereof, and when said first valve plug is seated, said second valve plug is spaced from its respective seat so as to define therewith an opening for the discharge of the metered contents of said metering chamber.

3. In a device for metering predetermined amounts of a flowable homogeneous mixture of an insoluble particulate solid in a fluid carrier, the combination of a casing having one end thereof closed and the other open, a reservoir in said casing, inlet and outlet ports in said casing for the passage of the flowable substance to and from said reservoir, said ports being disposed in vertical spaced relation with the former below the latter, valve means in said casing including an elongated stem journaled for reciprocal movement in the closed end of said casing, first and second valve plugs rigidly secured to said stem in predetermined spaced relation with said first plug disposed at the end of said reservoir below said inlet port, said second plug defining, in cooperation with said casing and said first plug a metering chamber of a predetermined volume communicable with said reservoir at the instance of said first plug, means defining associated valve seats in said casing spaced at a distance less than the distance between said valve plugs, said stem being reciprocable to alternately seat said valve plugs on their respective seats, such that when said second valve plug is seated, said first valve plug is disposed opposite said inlet port for deflecting at least a portion of the flowable substance downward into said metering chamber thereby filling the same with the substance, and when said first valve plug is seated, said second valve plug is spaced from its respective seat so as to define therewith an opening for the discharge of the metered contents of said metering chamber.

4. In a device for metering predetermined amounts of a flowable homogeneous mixture of an insoluble particulate solid in a fluid carrier, the combination of a casing having one end thereof closed and the other open, a reservoir in said casing, inlet and outlet ports in said casing for the passage of the flowable substance to and from said reservoir, said ports being disposed in vertical spaced relation with the former below the latter, valve means in said casing including an elongated stem journaled for reciprocal movement in the closed end of said casing, first and second valve plugs rigidly secured to said stem in predetermined spaced relation with said first plug disposed at the end of said reservoir below said inlet port, said second plug defining, in cooperation with said casing and said first plug a metering chamber of a predetermined volume communicable with said reservoir at the instance of said first plug, a sleeve extending at least part way into the open end of said casing, and having a length less than the distance between said valve plugs, the extremities of said sleeve having edges defining seats for said valve plugs, powered means for reciprocating said stem to alternately seat said valve plugs on their respective seats, such that when said second valve plug is seated, said first valve plug is disposed opposite said inlet port for deflecting at least a portion of the flowable substance downward into said metering chamber thereby filling the same with the substance, and when said first valve plug is seated, said second valve plug is spaced from its respective seat so as to define therewith an opening for the discharge of the metered contents of said metering chamber.

5. In a device for metering predetermined amounts of a flowable homogeneous mixture of an insoluble particulate solid in a fluid carrier, the combination of a casing having one end thereof closed and the other open, a reservoir in said casing, inlet and outlet ports in said casing for the passage of the flowable substance to and from said reservoir, said ports being disposed in vertical spaced relation with the former below the latter, valve means in said casing including an elongated stem journaled for reciprocal movement in the closed end of said casing, first and second valve plugs rigidly secured to said stem in predetermined spaced relation with said first plug disposed at the end of said reservoir below said inlet port, said second plug defining, in cooperation with said casing and said first plug a metering chamber of a predetermined volume communicable with said reservoir at the instance of said first plug, a sleeve extending at least part way into the open end of said casing, and having a length less than the distance between said valve plugs, the extremities of said sleeve having edges defining seats for said valve plugs, a solenoid coupled to said stem and means for energizing the same whereby said second valve plug is moved to its respective seat and said first valve plug is positioned opposite said inlet port for deflecting at least a portion of the flowable substance downward into said metering chamber, thereby filling the same, and spring means for moving said first valve plug to its respective seat when said solenoid is de-energized, and said second valve plug to a position in spaced relation with its respective seat so as to define therewith an opening for the discharge of the metering contents of said metering chamber.

6. A device for dispensing metered quantities of a flowable, homogeneous mixture of an insoluble particulate solid in a fluid carrier, which apparatus comprises a casing, a reservoir in said casing, inlet and outlet ports vertically disposed in said casing in communication with said reservoir, means connected with said ports for circulating the flowable mixture through said reservoir under turbulent conditions so as to maintain the uniformity of composition of said flowable mixture, a metering chamber in communication with said reservoir in said casing, valve means in said casing comprising a reciprocable valve stem disposed axially in said casing, a pair of circular valve plugs disposed in predetermined spaced relation on said stem, the upper of the said plugs being located, when in its uppermost position, laterally of said inlet port, said plugs being formed with lateral surfaces sloping inwardly toward said stem, means at the ends of said metering chamber defining seats against which said plugs may be alternately engaged in sealing relation when said stem is reciprocated, means for moving said stem and valve plugs alternately to their uppermost positions whereby flow of slurry introduced through said inlet port may be divided between said metering chamber and said reservoir, the portion of the flow deflected to said metering chamber being deflectable by an inwardly sloping side of said upper plug to impart and maintain slurry accumulating in said chamber in turbulent and homogeneous condition, and means for moving said stem to the discharge position at which the lower plug may be unseated and the upper plug seated so that slurry in said chamber is discharged at the bottom thereof.

7. A device for metering predetermined amounts of uniform components of a flowing mixture comprising a casing, a reservoir in said casing, a metering chamber communicating with and in the lower section of said casing, valve seats disposed on opposite ends of said metering chamber, valve means reciprocal in said casing including upper and lower valve plugs associated respectively with said seats and disposed in a predetermined fixed relation with each other, such that the distance between them is greater than the distance between said seats, said valve means and said metering chamber together defining a predetermined fixed volume, means for reciprocating said valve means for alternately seating said valve plugs on their respective seats, whereby communication between said metering chamber and said reservoir is alternately effected and prevented, and the metering chamber may consequently be filled and emptied, an inlet port for said flowing mixture communicating with said reservoir and disposed laterally of the uppermost position of said upper valve plug, said inlet port and said upper valve plug cooperating when the latter is in its uppermost position to cause a portion of the inflowing mixture to fill said metering chamber and to impart additional turbulence to the mixture in said metering chamber to further assure uniformity of composition of the mixture, and an outlet port for said mixture communicating with said reservoir and disposed above said inlet port.

8. Apparatus for inoculating seed or the like by bringing the same into intimate contact with a predetermined amount of a slurry of an insoluble particle solid disposed in a fluid carrier, said apparatus comprising the combination of a hopper for storing seed, a weighing device connected to said hopper for measuring preselected amounts of seed from said hopper and dispensing the same to a mixing chamber, and a metering device adapted to dispense a predetermined amount of inoculant into said mixing chamber in proportion to the quantity of seed contained therein, said metering device comprising a casing, a reservoir in said casing, inlet and outlet ports vertically disposed in said casing in communication with said reservoir, means connected with said ports for circulating the flowable mixture through said reservoir under turbulent conditions so as to maintain the uniformity of composition of said flowable mixture, a metering chamber in communication with said reservoir in said casing, valve means in said casing comprising a reciprocable valve stem disposed axially in said casing, a pair of circular valve plugs disposed in predetermined spaced relation on said stem, the upper of the said plugs being located, when in its uppermost position, laterally of said inlet port, said plugs being formed with lateral surfaces sloping inwardly toward said stem, means at the ends of said metering chamber defining seats against which said plugs may be alternately engaged in sealing relation when said stem is reciprocated, means for moving said stem and valve plugs alternately to their uppermost positions whereby flow of slurry introduced through said inlet port may be divided between said metering chamber and said reservoir, the portion of the flow deflected to said metering chamber being deflectable by an inwardly sloping side of said upper plug to impart and maintain slurry accumulating in said chamber in turbulent and homogeneous condition, and means for moving said stem to the discharge position at which the lower plug may be unseated and the upper plug seated so that slurry in said chamber is discharged at the bottom thereof.

References Cited by the Examiner
UNITED STATES PATENTS

| 1,224,347 | 5/1917  | Wolfe     | 259—3     |
| 2,122,216 | 6/1938  | Seawell   | 222—365 X |
| 2,521,347 | 9/1950  | Davis     | 222—453   |
| 2,623,737 | 12/1952 | McEachran | 259—3     |

LOUIS J. DEMBO, *Primary Examiner.*

LAVERNE D. GEIGER, *Examiner.*